Sept. 1, 1942.    A. L. WALLACE    2,294,640
MEANS FOR AFFIXING COUPLINGS TO HOSE
Filed June 8, 1940
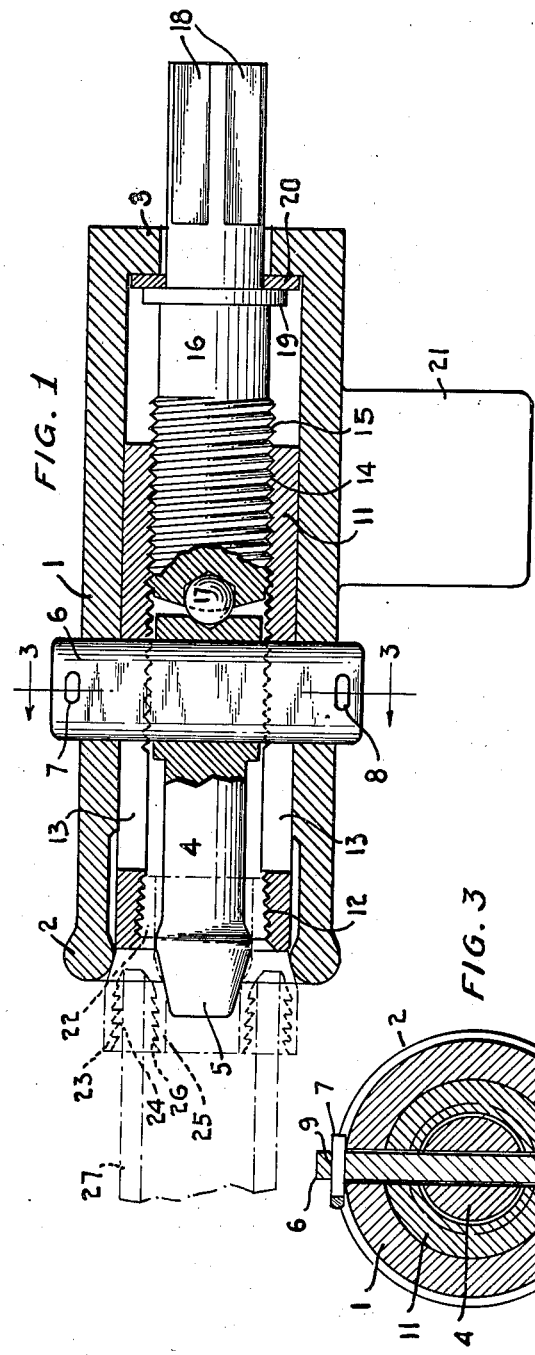
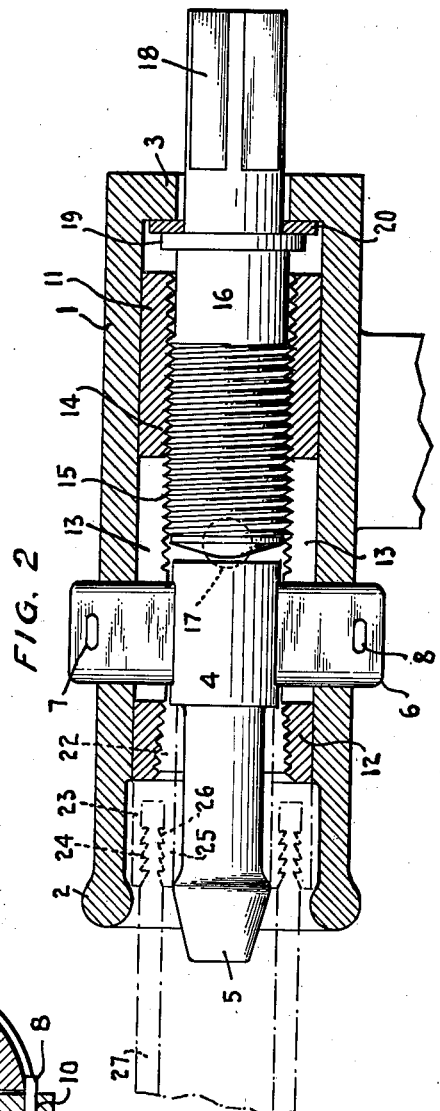
A. L. Wallace  INVENTOR.
BY Thomas Howe  ATTORNEY.

Patented Sept. 1, 1942

2,294,640

UNITED STATES PATENT OFFICE 2,294,640

MEANS FOR AFFIXING COUPLINGS TO HOSE

Archibald L. Wallace, Northport, N. Y.

Application June 8, 1940, Serial No. 339,532

6 Claims. (Cl. 29—88.2)

This invention relates to means for affixing coupling or terminal members to hose.

The coupling or terminal to which the invention is applicable is such as has two jaws normally separated so that the end of the hose may be readily inserted therebetween and the coupling is then affixed to the hose by forcing the jaws together to grip the hose.

The main object of the invention is to provide apparatus of the character as indicated which shall be simple and efficient.

A further object of the invention is to provide a device of the character described which shall be portable, being readily transportable to any desirable location and at such location may be used by unskilled operators and without other special equipment.

Other and ancillary objects of the invention will appear hereinafter.

In the accompanying drawing which illustrates the invention—

Fig. 1 is an axial section, partly broken away, of a device embodying the invention, the device in this view being shown in condition for beginning the affixing operation;

Fig. 2 is a similar view of the apparatus of Fig. 1, such apparatus, however, being in the condition after the affixing operation has been completed; and Fig. 3 is a section on the line 3—3 of Fig. 1.

Referring to the drawing, the apparatus comprises an outer cylinder 1 having at one end an annular enlarged rounded portion 2 and at the other end an inwardly extending flange 3. Concentrically mounted within the cylinder 1 is a mandrel 4 having the tapered end portion 5 which is within and concentric with the enlarged rounded portion 2 of the outer cylinder.

Extending through the mandrel 4 and the outside cylinder 1 is a cross bar 6 which secures the mandrel and outer cylinder from relative longitudinal movement, the cross bar being held in position by means of cotter pins 7 and 8 extending through holes 9 and 10 in the cross bar adjacent its ends.

Reciprocating within the outer cylinder 1 is an inner cylinder 11 bearing upon the interior wall of the cylinder 1 and having screw-threads 12 adapted to engage with the body of the coupling to be affixed to the hose. Also the cylinder 11 is provided with slots 13 through which the cross bar 6 passes, the slots permitting the longitudinal reciprocation of the cylinder 11. The cylinder 11 also has screw-threads 14 engaging with screw-threads 15 upon a rotatable shaft 16 bearing upon the end of the mandrel 4 by means of a ball 17 which reduces the frictional resistance to the rotation of the shaft 16. The shaft 16 extends through an opening in the flange 3 to the exterior of the cylinder 1, it having a series of flat sides 18 at its outer end to non-rotatably engage with a wrench, crank or other turning means.

The shaft 16 is provided with a collar 19 which bears against the washer 20 which in turn bears against the end flange 3 of the cylindrical member. This prevents the sliding of the shaft 16 in one direction while the bearing at the ball 17 prevents it from sliding longitudinally in the opposite direction.

Projecting from the outer cylinder 1 is an integral projection 21 whereby the device may be held by clamping it in a vice or in other suitable ways.

In the use of the device the parts are, at the beginning of the affixing operation, in the position as shown in Fig. 1, the inner cylinder 11 being at the left hand (Fig. 1) part of the outer cylinder or casing 1. The coupling has its body portion 22 screwed into the end of the cylinder 11. This coupling also has, formed integral with the body, the outer circular jaw 23 provided with hose gripping teeth 24, and the inner circular jaw 25 having the teeth 26. The jaws 23 and 25 are concentric with each other and are normally separated by a distance such that the hose 27, of rubber or other suitable material, to which the coupling is to be affixed, may be readily inserted between the jaws as shown in Fig. 1. The parts of the device being in the position as shown in Fig. 1, and the coupling and hose having been adjusted therein as shown in that figure, the shaft 16 is turned in a direction to draw the inner cylinder 11 towards the right (Fig. 1). This operates to draw or force jaws 23 and 26, with the hose held therein, through the annular aperture between the rounded end 2 of the cylinder 1, and the tapered end 5 of the mandrel. As the jaws are thus drawn through this aperture they are forced together to grip the hose until, when the parts are in the position as shown in Fig. 2, the jaws have been drawn through the aperture and forced into the position where the hose is tightly gripped by them and the coupling is affixed to the hose. The shaft 16 may then be rotated in the opposite direction to move the inner cylinder 11 to the left (Fig. 2) when the coupling will be extended from the end of the cylindrical member 1 and the coupling can be unscrewed from the cylinder 11. Another coupling may then be inserted in the apparatus and the operation of affixing it to the hose, as described, may be repeated and such operations may be continued indefinitely.

While the invention has been illustrated in what is considered its best application it may have other embodiments without departing from its spirit and is not, therefore, limited to the structure shown in the drawing.

What I claim is:

1. In means for securing to a hose a coupling comprising a body and inner and outer jaws adapted to be forced toward each other to grip the hose, the combination with a cylindrical member, of a circular mandrel within the same, means fixing said mandrel within and concentric with said member to form an annular gap between said member and said mandrel, said member being of a size to contract the outer jaw of a coupling and said mandrel being of a size to expand the inner jaw of the same coupling as the coupling is passed into the gap and a reciprocating member for forcing the jaws of a coupling into the gap between said member and mandrel thereby to force said jaws toward each other to grip the hose.

2. In means for securing to a hose a coupling comprising a body and inner and outer jaws adapted to be forced toward each other to grip the hose, the combination with a cylindrical member, of a circular mandrel within the same, means fixing said mandrel within and concentric with said member to form an annular gap between said mandrel and said member, said member being of a size to contract the outer jaw of a coupling and said mandrel being of a size to expand the inner jaw of the same coupling as the coupling is passed into the gap and a reciprocating member for forcing the jaws of a coupling into the gap between said cylindrical member and mandrel to thereby force said jaws toward each other to grip the hose, said member having an end portion rounded in section and the end portion of said mandrel being tapered.

3. In means for securing to a hose a coupling comprising a body and jaws adapted to be forced toward each other to grip the hose, the combination with a cylindrical member, of a circular mandrel within the same, said mandrel being within and concentric with said member and forming therebetween an annular gap, the fixed inner and outer sides of which are so restricted with respect to the jaws of a coupling that they will force the jaws toward each other to grip the hose when the jaws are forced into the gap between said member and mandrel, means for securing said member and mandrel in fixed longitudinal relation, an inner cylindrical member longitudinally reciprocating within said first mentioned cylindrical member, said inner cylindrical member being adapted to be secured to the body of the coupling and means for moving said inner cylindrical member longitudinally of the first mentioned cylindrical member whereby the jaws of the coupling are forced between said cylindrical member and said mandrel thereby forcing the jaws together to grip the hose.

4. In means for securing to a hose a coupling comprising a body and jaws adapted to be forced toward each other to grip the hose, the combination with a cylindrical member, of a circular mandrel within the same, said mandrel being within and concentric with said member and forming therebetween an annular gap, the fixed inner and outer sides of which are so restricted with respect to the jaws of a coupling that they will force the jaws toward each other to grip the hose when the jaws are forced into the gap between said member and mandrel, means for securing said member and mandrel in fixed longitudinal relation, an inner cylindrical member longitudinally reciprocating within said first mentioned cylindrical member, said inner cylindrical member being adapted to be secured to the body of the coupling and means for moving said inner cylindrical member longitudinally of the first mentioned cylindrical member whereby the jaws of the coupling are forced between said cylindrical member and said mandrel thereby forcing the jaws together to grip the hose, said inner cylindrical member being between the first mentioned member and said mandrel and having screw threads for engagement with the coupling.

5. In means for securing to a hose a coupling comprising a body and jaws adapted to be forced toward each other to grip the hose, the combination with a cylindrical member, of a circular mandrel within the same, said mandrel being within and concentric with said member and forming therebetween an annular gap, the fixed inner and outer sides of which are so restricted with respect to the jaws of a coupling that they will force the jaws toward each other to grip the hose when the jaws are forced into the gap between said member and mandrel, means for securing said member and mandrel in fixed longitudinal relation, an inner cylindrical member longitudinally reciprocating within said first mentioned cylindrical member, said inner cylindrical member having screw threads for securing it to the body of the coupling, a rotatable screw-threaded shaft bearing against said mandrel, said inner cylindrical member being between the first mentioned member and said mandrel and having screw-threads for engagement with screw-threads upon said shaft for moving said inner cylindrical member longitudinally whereby the jaws of the coupling are forced between the first mentioned member and said mandrel thereby forcing the jaws together to grip the hose.

6. In means for securing to a hose a coupling comprising a body and jaws adapted to be forced toward each other to grip the hose, the combination with a cylindrical member having a rounded end portion, of a concentrically mounted mandrel, having a tapered end portion, within and concentric with said cylindrical member and forming therebetween an annular gap, the fixed inner and outer sides of which are so restricted with respect to the jaws of a coupling that they will force the jaws toward each other to grip the hose when the jaws are forced into the gap between said member and mandrel, a cross bar securing said cylindrical member and mandrel against longitudinal movement, an inner cylindrical member longitudinally reciprocating within the first mentioned cylindrical member, said inner cylindrical member having slots through which said cross bar passes to permit longitudinal reciprocation of the said inner cylindrical member, a rotatable shaft bearing upon said mandrel and in screw-threaded engagement with said inner cylindrical member for longitudinally moving said inner cylindrical member and said inner cylindrical member also having screw-threads adapted to engage with the coupling.

ARCHIBALD L. WALLACE.